US011338392B2

(12) United States Patent
Chang et al.

(10) Patent No.: US 11,338,392 B2
(45) Date of Patent: May 24, 2022

(54) CUTTING METHOD FOR FORMING CHAMFERED CORNERS

(71) Applicant: Industrial Technology Research Institute, Hsin-Chu (TW)

(72) Inventors: Hsin-Yu Chang, Taichung (TW); Fu-Lung Chou, Tainan (TW); Chien-Jung Huang, Tainan (TW); Yu-Chung Lin, Tainan (TW); Min-Kai Lee, Tainan (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 575 days.

(21) Appl. No.: 16/279,186

(22) Filed: Feb. 19, 2019

(65) Prior Publication Data
US 2020/0147729 A1    May 14, 2020

(30) Foreign Application Priority Data
Nov. 9, 2018    (TW) .................................. 107139884

(51) Int. Cl.
*B23K 26/36*    (2014.01)
*B23K 26/38*    (2014.01)
(Continued)

(52) U.S. Cl.
CPC ........ *B23K 26/362* (2013.01); *B23K 2101/18* (2018.08); *B23K 2101/36* (2018.08); *B23K 2103/54* (2018.08)

(58) Field of Classification Search
CPC .... B23K 26/36–364; B23K 26/38–389; B23K 26/40
See application file for complete search history.

(56) References Cited

U.S. PATENT DOCUMENTS

| 7,847,239 B2 | 12/2010 | Lu et al. |
| 8,520,708 B2 | 8/2013 | Yang et al. |

(Continued)

FOREIGN PATENT DOCUMENTS

| CN | 102271860 A | 12/2011 |
| CN | 104440497 A | 3/2015 |

(Continued)

OTHER PUBLICATIONS

M. Kumkar et al., "Comparison of different processes for separation of glass and crystals using ultrashort pulsed lasers", 2014, vol. 8972, SPIE LASE.

(Continued)

*Primary Examiner* — Michael A Laflame, Jr.
(74) *Attorney, Agent, or Firm* — WPAT, PC

(57) ABSTRACT

A cutting method for forming a chamfered corner includes a step of selecting a light pattern-adjusting module according to a pre-cut chamfer angle, a step of the light pattern-adjusting module emitting a laser beam to a substrate and thus forming a modified region extending in a thickness direction at the substrate, a step of the light pattern-adjusting module adjusting an axial energy distribution of a light pattern of the laser beam to vary an appearance of the modified region so as to form the modified region fulfilling the pre-cut chamfer angle, and a step of etching the substrate having the modified region to form a chamfered surface on the substrate by cutting the modified region from the substrate.

8 Claims, 5 Drawing Sheets

(51) Int. Cl.
  *B23K 26/40* (2014.01)
  *B23K 26/362* (2014.01)
  *B23K 103/00* (2006.01)
  *B23K 101/36* (2006.01)
  *B23K 101/18* (2006.01)

(56) References Cited

U.S. PATENT DOCUMENTS

| | | | |
|---|---|---|---|
| 8,669,507 | B2 | 3/2014 | Lin et al. |
| 8,673,167 | B2 | 3/2014 | Shimoi et al. |
| 8,741,777 | B2 | 6/2014 | Shimoi et al. |
| 8,780,446 | B2 | 7/2014 | Lee et al. |
| 2003/0024910 | A1* | 2/2003 | Horsting ............. B23K 26/067 219/121.71 |
| 2010/0147813 | A1* | 6/2010 | Lei ..................... C03B 33/04 219/121.72 |
| 2011/0290767 | A1* | 12/2011 | Muscat-Tyler ......... B23K 10/00 219/121.44 |
| 2014/0027951 | A1* | 1/2014 | Srinivas ............... B23K 26/40 264/400 |
| 2015/0166391 | A1 | 6/2015 | Marjanovic et al. |
| 2015/0299018 | A1* | 10/2015 | Bhuyan ............... B23K 26/53 65/29.18 |
| 2016/0016257 | A1 | 1/2016 | Hosseini |
| 2016/0031745 | A1* | 2/2016 | Ortner ................ B23K 26/14 65/29.1 |
| 2016/0147214 | A1 | 5/2016 | Lu et al. |
| 2016/0159679 | A1 | 6/2016 | West |
| 2018/0044219 | A1* | 2/2018 | Marjanovic ......... C03B 33/0222 |
| 2019/0348272 | A1* | 11/2019 | Ecker ................. B24B 9/065 |

FOREIGN PATENT DOCUMENTS

| | | |
|---|---|---|
| CN | 104741793 A | 7/2015 |
| CN | 104968620 A | 10/2015 |
| CN | 105236759 A | 1/2016 |
| CN | 105859147 A | 8/2016 |
| CN | 106132886 A | 11/2016 |
| CN | 106167348 A | 11/2016 |
| CN | 207873412 U | 9/2018 |
| EP | 2553717 A2 | 2/2013 |
| FR | 2977513 | 1/2013 |
| JP | 2014177369 | 9/2014 |
| TW | 345517 B | 11/1998 |
| TW | I335252 | 1/2011 |
| TW | I374787 | 10/2012 |
| TW | I383855 | 2/2013 |
| TW | 201309608 | 3/2013 |
| TW | I438050 | 5/2014 |
| TW | I448730 | 8/2014 |
| TW | I454331 B | 10/2014 |
| TW | I499146 | 9/2015 |
| TW | I531436 | 5/2016 |
| TW | 201621986 | 6/2016 |
| TW | I577484 | 4/2017 |

OTHER PUBLICATIONS

Shih-Jeh Wu et al., "Glass Cutting With Elongation Optics in Comparison to Conventional Methods by Laser", 2016, p. 923-932, vol. 40, No. 5, Transactions of the Canadian Society for Mechanical Engineering.
Kwang-Ryul Kim et al., "Hybrid Laser Cutting for Flat Panel Display Glass", 2008, pp. 6978-6981, vol. 47, No. 8, Japanese Journal of Applied Physics.
CN OA dated Mar. 24, 2021.
Editorial Board of Construction Workers Vocational Skills Training Materials, Construction Engineering Series—Construction Workers Vocational Skills Training Material, Chemical Etching of Glass, Aug. 31, 2016, pp. 130-131.
Taiwan Intellectual Property Office, Notice of Allowance dated Sep. 26, 2019.

* cited by examiner

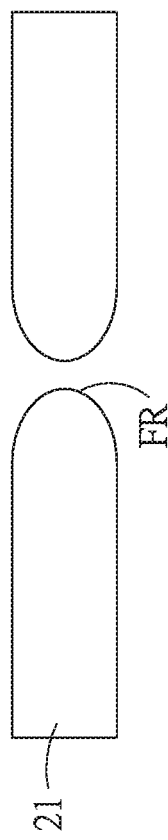
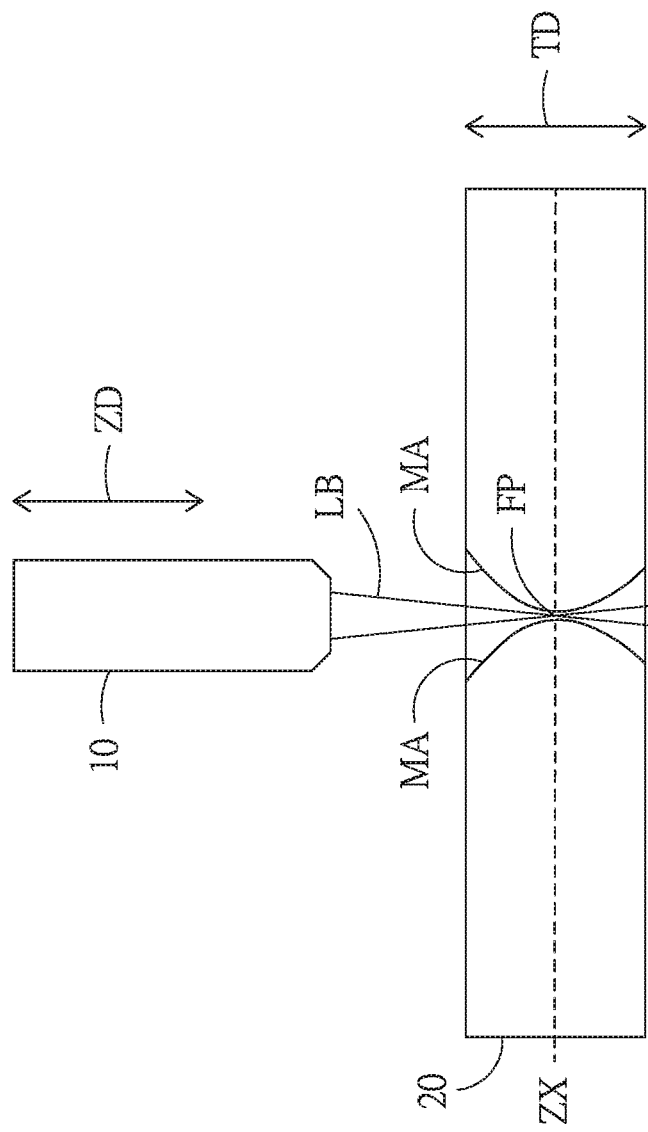

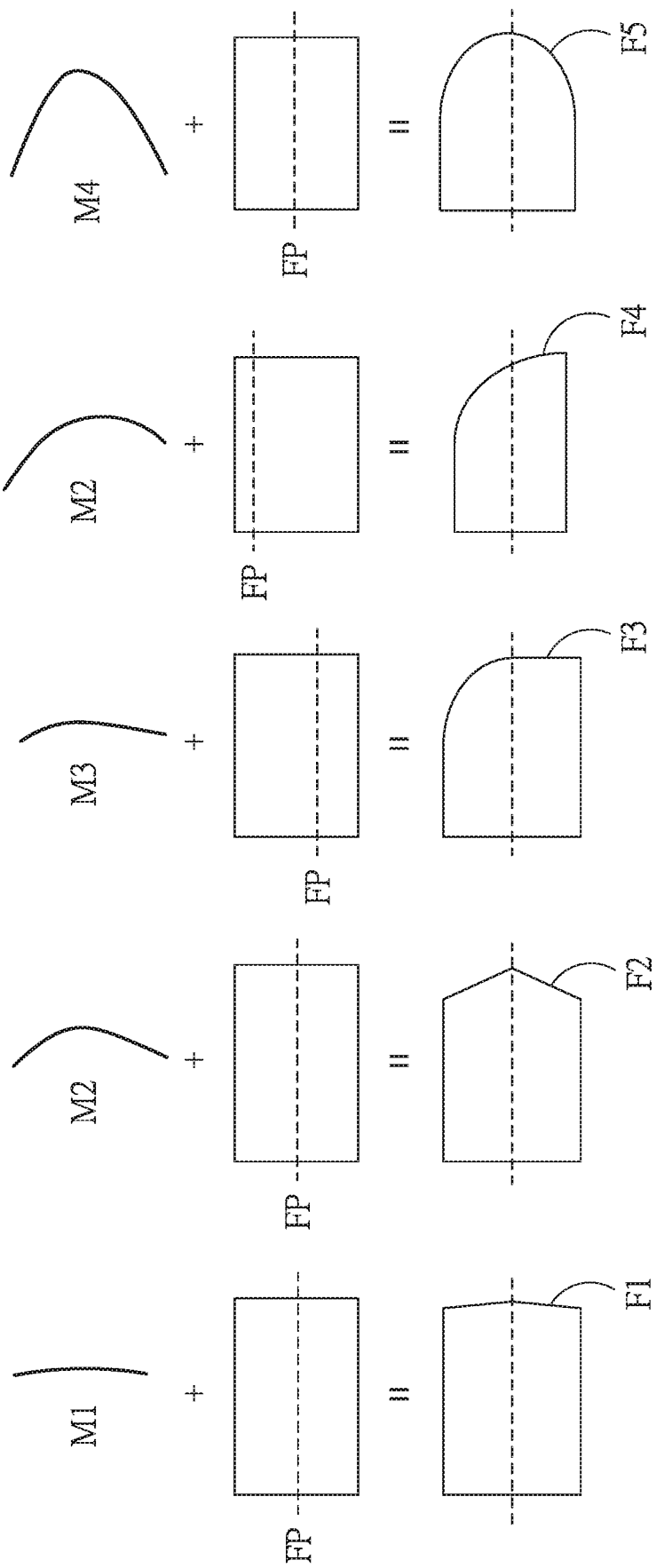

CUTTING METHOD FOR FORMING CHAMFERED CORNERS

CROSS REFERENCE TO RELATED APPLICATION

This patent application claims the benefit of Taiwan Patent Application No. 107139884 filed on Nov. 9, 2018, the disclosures of which are incorporated by references herein in its entirety.

TECHNICAL FIELD

The present disclosure relates in general to a cutting method for forming a chamfered corner.

BACKGROUND

In response to demands for versatile electronic products in broader screens, enhanced touch functions, more attractive appearances and higher collision strength, the adoption of full or half full screens is usually one of the solutions. Generally, in the art, a work process for polishing edges of glass for the screen is necessary to obtain smooth or round edges. Such a process usually increases the work time but reduces the yield. Accidentally, if the glass is somehow broken or damaged during the polishing, then the glass shall be abandoned prior to the execution of the following scheduled processes. Definitely, abandonment of the damage glass would increase the production cost. Further, while in polishing the rude edges of glass to obtain corresponding round or smooth edges, additional jigs are needed to fix the glass, and also weight and width of the glass shall be increased for the yield of polishing.

Thus, a topic for providing an improved cutting method for forming a chamfered corner to overcome the aforesaid problem is definitely urgent to the art.

SUMMARY

An object of the present disclosure is to provide a cutting method for forming a chamfered corner that includes a step of introducing a laser beam to modify a glass substrate prior to a cutting. Also, the cutting method for forming a chamfered corner provided by this disclosure can be used to alter appearances of modified regions of the substrate so as to obtain therefrom qualified pre-cut chamfer angles, such that the substrate can be furnished with various modified regions with corresponding pre-cut chamfer angles. Then, an etching process can be applied to break the substrate so as to obtain chamfered corner surfaces with qualified chamfer angles for fulfilling the requirements of a back plate for a 2.5D-3D display.

In this disclosure, the cutting method for forming a chamfered corner includes a step of selecting a light pattern-adjusting module according to a pre-cut chamfer angle, a step of the light pattern-adjusting module emitting a laser beam to a substrate and thus forming a modified region extending in a thickness direction at the substrate, a step of the light pattern-adjusting module adjusting an axial energy distribution of a light pattern of the laser beam to vary an appearance of the modified region so as to form the modified region fulfilling the pre-cut chamfer angle, and a step of etching the substrate having the modified region to form a chamfered surface on the substrate by cutting the modified region from the substrate.

As stated, the cutting method for forming a chamfered corner provided by this disclosure firstly selects a light pattern-adjusting module according to a pre-cut chamfer angle, then utilizes an axial energy distribution of the light pattern of a laser beam to obtain a modified region with chamfers, varies a focal position of the laser beam in the substrate so as to change pattern appearance and transmission energy of the axial energy distribution of the light pattern of the laser beam for obtaining the required appearance of the modified region in the substrate, and finally etches the substrate after modification so as to obtain a desired chamfered surface. Thereupon, to meet various edge needs for versatile electronic products, different but satisfied chamfers can be obtained.

Further, in this disclosure, by adjusting the axial energy distribution of the light pattern and by varying the position of the focus in the substrate, no more additional jig is needed to support the substrate.

In addition, in this disclosure, by adjusting the axial energy distribution of the light pattern and by varying the position of the focus in the substrate, the glass for the screen needn't add mass and thickness. Thus, a substrate with a desired chamfered surface can be made to be light and thin.

Furthermore, the method provided by this disclosure can reduce the entire labor time, and also the possibility of damage glass from producing the chamfered surface can be substantially reduced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 2A is a schematic view of an embodiment of a substrate cut by the cutting method for forming a chamfered corner of FIG. 1.

FIG. 2B demonstrates schematically an embodiment of the light pattern-adjusting module emitting a laser beam onto the substrate in accordance with this disclosure;

FIG. 5A to FIG. 5E demonstrate various appearances of the chamfered surfaces formed by the respective light pattern-adjusting modules in accordance with this disclosure.

DETAILED DESCRIPTION

Figure 1:
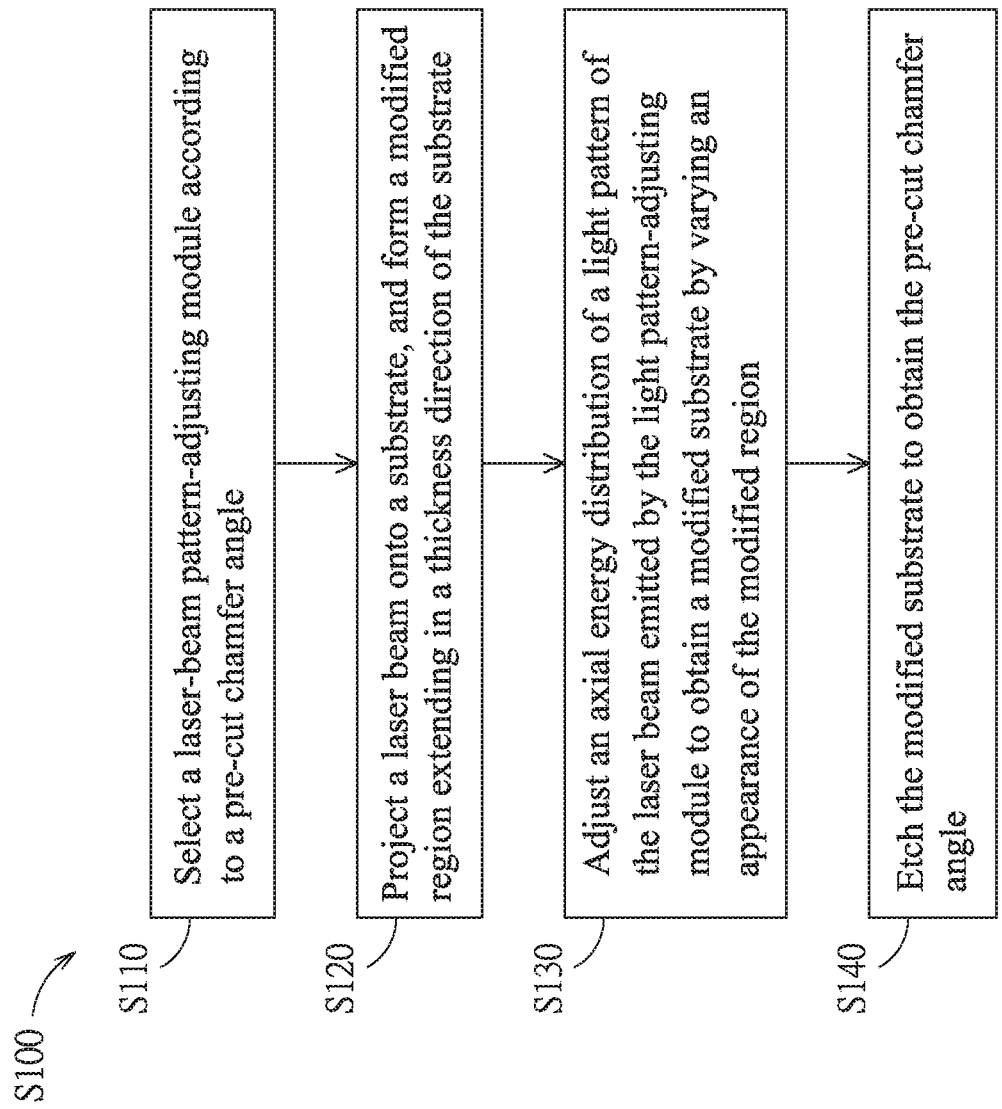
FIG. 1 is a flowchart of the preferred cutting method for forming a chamfered corner in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 3:
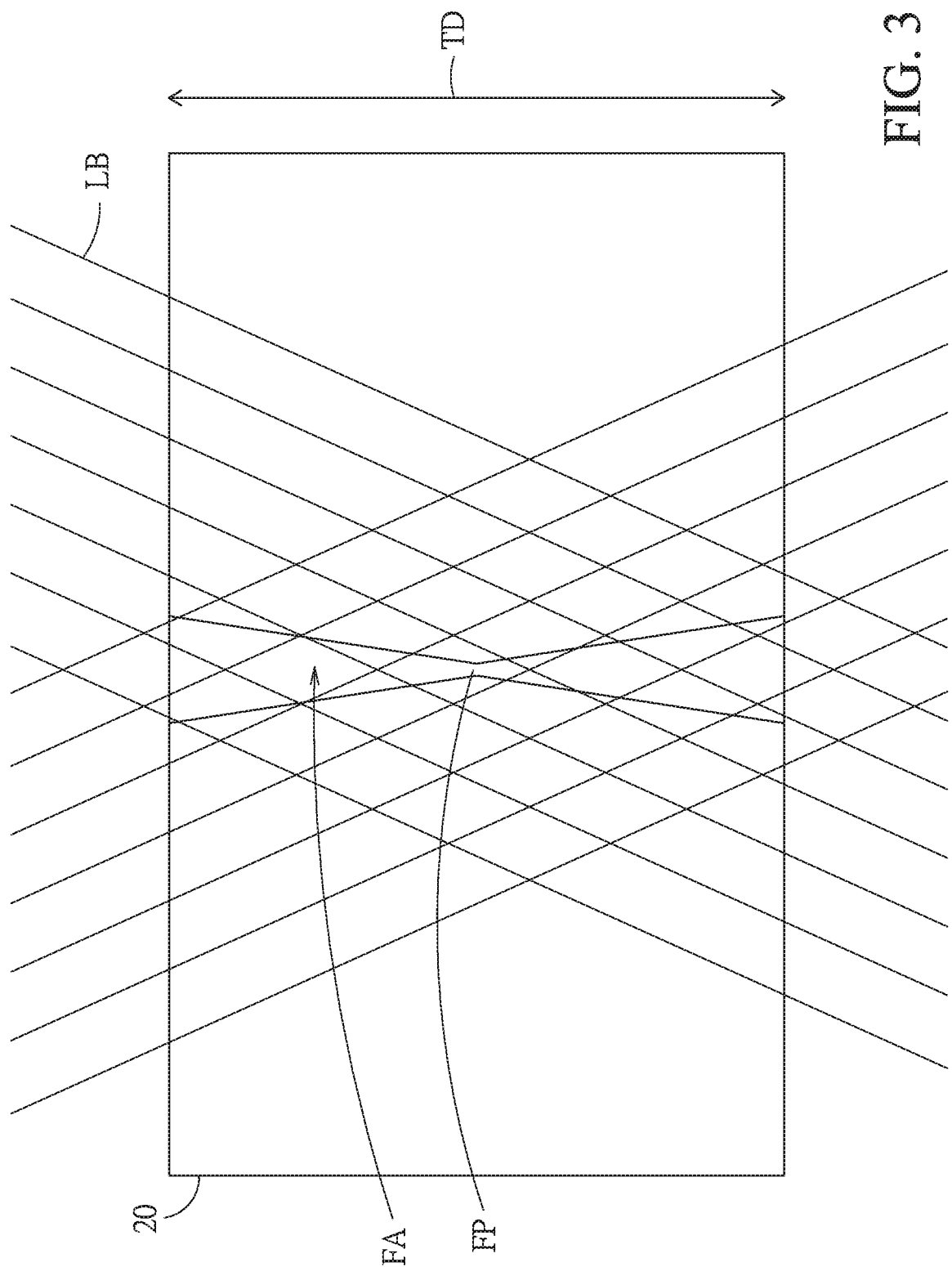
FIG. 3 is a schematic enlarged view of a portion of FIG. 2B.
Figure 4:
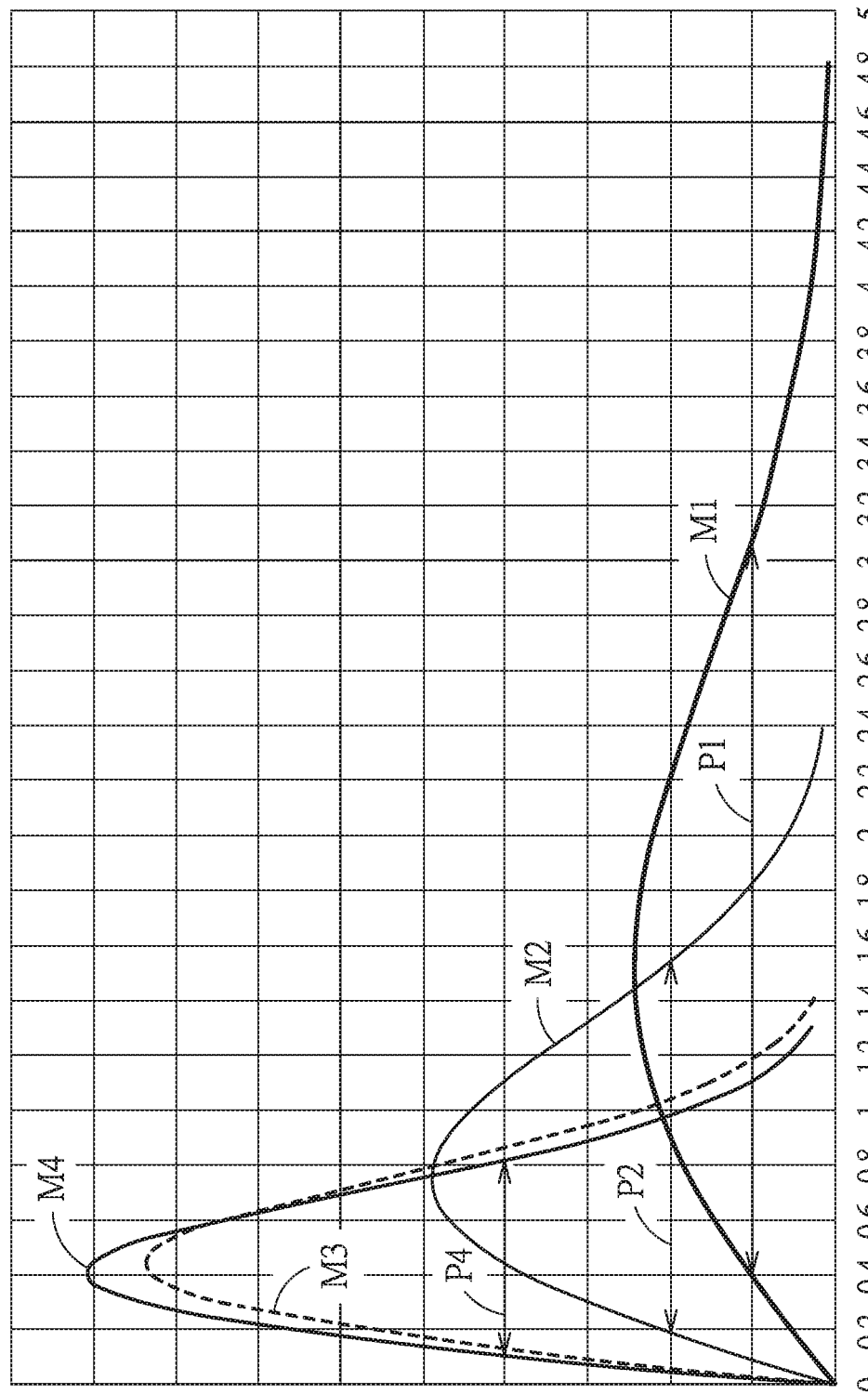
FIG. 4 shows schematically the relationship between various axial energy distributions of the light pattern provided by the light pattern-adjusting module and corresponding depths in accordance with this disclosure.

Refer now to FIG. 1 through FIG. 5E; where FIG. 1 is a flowchart of the preferred cutting method for forming a chamfered corner in accordance with this disclosure, FIG. 2A is a schematic view of an embodiment of a substrate cut by the cutting method for forming a chamfered corner of FIG. 1, FIG. 2B demonstrates schematically an embodiment of the light pattern-adjusting module emitting a laser beam onto the substrate in accordance with this disclosure, FIG. 3 is a schematic enlarged view of a portion of FIG. 2B, FIG. 4 shows schematically the relationship between various axial energy distributions of the light pattern provided by the light pattern-adjusting module and corresponding depths in accordance with this disclosure, and FIG. 5A to FIG. 5E demonstrate various appearances of the chamfered surfaces formed by the respective light pattern-adjusting modules in accordance with this disclosure.

As shown in FIG. 1, the cutting method for forming a chamfered corner S100 includes Step S110 to Step S140 as follows. In Step S110, according to a pre-cut chamfer angle, a light pattern-adjusting module is selected. Referring to FIG. 2A as a typical example, each side of the cut substrate 21 has a chamfered surface FR with a chamfer angle at the middle cut thereof. As shown in FIG. 2B, according to the chamfer angle for a pre-cut substrate 20, a light pattern-adjusting module 10 is selected to provide a laser beam LB for obtaining an axial energy distribution of the light pattern to meet a pre-cut chamfer angle.

For example, as shown in FIG. 4, M1, M2, M3 and M4 stand for different light pattern-adjusting modules that are accounted for respective chamfered corners. Each of the light pattern-adjusting modules M1, M2, M3, M4 is featured by specific relationships of the different axial energy distributions of the light pattern and corresponding depths (mm), in which the depth stands for the distance into the substrate 20 from an outer surface thereof adjacent to the light pattern-adjusting module. In this embodiment, by determining the light pattern-adjusting modules, different pre-cut chamfer angles for substrates would be generated to produce versatile substrates with smooth edges having individual chamfered corners. Namely, by judging the pre-cut chamfer angle for the substrate 20, an appropriate light pattern-adjusting module with a relevant axial energy distribution of the light pattern can be determined from FIG. 4. In FIG. 4, different light pattern-adjusting modules stand for different chamfer angles for the substrate 20. It shall be explained that the light pattern-adjusting modules M1, M2, M3, M4 of FIG. 4 are only raised for examples, not for limiting the scope of this disclosure.

In this embodiment, the light pattern-adjusting module 10, as a lens set consisted of at least one conical lens, at least one spherical lens, at least one aspherical lens or/and at least one diffractive component, can focus the laser beam LB onto the substrate 20, with the associated axial energy distribution of the light pattern to be adjustable. For example, in this embodiment, the light pattern-adjusting module 10 is consisted of a conical lens and a spherical lens. In another embodiment, the light pattern-adjusting module 10 is consisted of a conical lens and an aspherical lens. In a further embodiment, the light pattern-adjusting module 10 is consisted of a diffractive component and a spherical lens. In one more embodiment, the light pattern-adjusting module 10 can be consisted of a diffractive component and an aspherical lens. It shall be understood that the aforesaid combinations for the light pattern-adjusting module are only some of many exemplary examples according to this disclosure, not used to limit the scope of this disclosure.

In this embodiment, Step S110 of the select light pattern-adjusting module includes that a ratio of an FWHM (Full width at half maximum) of a specific axial energy distribution of the light pattern to the corresponding thickness of the substrates 30 for the light pattern-adjusting module 10 is at least greater than 1.2. Namely, in the light pattern-adjusting module 10, the FWHM of the axial energy distribution of the light pattern is at least 1.2 times of the thickness of the substrates 30, so that the axial energy distribution of the light pattern of the laser beam LB emitted by the light pattern-adjusting module 10 can reach or at least cover the desired modified region of the substrate 20 so as to ensure the integrity of machining. In this embodiment, the thicknesses of the substrate 20 is the length measurement of the substrate 20 in a thickness direction TD, and the axial energy distribution of the light pattern of the laser beam can be a form of interference, diffraction or refraction.

Referring back to FIG. 1, in Step S120, a laser beam LB is projected onto a substrate 20 so as to form a modified region MA extending in a thickness direction TD of the substrate 20. In detail, the substrate 20 is set on the cutting platform (not shown herein), and a control end of the cutting platform provides a pre-cut route including a pre-cut chamfer angle. In this embodiment, the substrate 20 can be an Si substrate such as a glass, a wafer or an Si-contained substrate. In particular, the substrate can be flexible or inflexible, but simply depends on practical requirements of the electronic products.

Then, as shown in FIG. 2B, the light pattern-adjusting module 10 projects the laser beam LB to the substrate 20, in which the laser source can be a laser pulse beam or a non-laser pulse beam produced by a non-laser generator such as a pulse flash lamp or a pulse LED.

In addition, in this embodiment, a wavelength of the laser beam LB is ranged between 0.3 μm and 11 μm, and the energy density of the laser beam LB is ranged between 0.5 $J/cm^2$ and 80 $J/cm^2$. As shown in FIG. 2B, while the substrate 20 is radiated by the laser beam LB, the axial energy distribution of the light pattern FA of the laser beam LB (as shown in FIG. 3) would modify the substrate 20. The laser beam LB would form a focal position FP at a center ZX of the substrate 20, and a modified region MA therein extending in the thickness direction TD.

Referring back to FIG. 1, then, in Step S130, the axial energy distribution of the light pattern FA of the laser beam LB emitted by the light pattern-adjusting module 10 is adjusted or modulated, through varying a morphology or appearance of the modified region, to obtain the modified substrate MA fulfilling the pre-cut chamfer angle.

In one embodiment, from FIG. 4, by evaluating the relationships between the axial energy distribution of the light pattern and the corresponding depths (mm), one of the light pattern-adjusting modules M1, M2, M3, M4 having and appropriate axial energy distribution of the light pattern can be determined. By utilizing specific pattern appearance and transmission energy provided by the axial energy distribution of the light pattern of the light pattern-adjusting module 10, a desired modified region MA can be formed in the substrate 20 in the thickness direction TD (i.e., varying with respect to the depths). In particular, the modified region MA fulfills the appearance of the pre-cut chamfer angle. It shall be explained that, in FIG. 4, the light pattern-adjusting module M1, M2, M3 or M4 is only one of typical examples, not to limit the scope of this disclosure.

For example, refer to different chamfered surfaces F1~F5 listed from FIG. 5A to FIG. 5E, respectively. In one embodiment, referring also to FIG. 2B, by having the chamfered surface F1 in FIG. 5A as an example, since the chamfered surface F1 is smoother, thus the light pattern-adjusting module M1 with less-varying axial energy distribution of the light pattern can be selected. By adjusting the focal position FP of the laser beam LB to the center ZX of the substrate 20, the FWHM P1 of the axial energy distribution of the light pattern for the light pattern-adjusting module M1 as shown in FIG. 4 can be obtained, and therefrom a corresponding modified region MA extending in the thickness direction TD of the substrate 20 can be formed. With the specific pattern appearance and transmission energy contributed by the FWHM P1 of the axial energy distribution of the light pattern, the desired modified region can be formed in the substrate 20 to present an appearance meeting the pre-cut chamfer angle MA.

In one embodiment, referring also to FIG. 2B, by having the chamfered surface F5 in FIG. 5E as an example, since the chamfered surface F5 demonstrates a sharper appearance, thus the light pattern-adjusting module M4 with severe-varying axial energy distribution of the light pattern (having major pattern energy clustered around the highest point) can be selected. By adjusting the focal position FP of the laser beam LB to the center ZX of the substrate 20, the FWHM P4 of the axial energy distribution of the light pattern for the light pattern-adjusting module M4 as shown in FIG. 4 can be obtained, and therefrom a corresponding modified region MA extending in the thickness direction TD of the substrate 20 can be formed. With the specific pattern appearance and transmission energy contributed by the FWHM P4 of the axial energy distribution of the light pattern, the desired modified region can be formed in the substrate 20 to present an appearance meeting the pre-cut chamfer angle MA.

In one embodiment, referring also to FIG. 2B, by having the chamfered surface F2 in FIG. 5B as an example, since the chamfered surface F2 demonstrates an appearance less varying than the F5, thus the light pattern-adjusting module M2 with proper axial energy distribution of the light pattern can be selected. By adjusting the focal position FP of the laser beam LB to the center ZX of the substrate 20, the FWHM P2 of the axial energy distribution of the light pattern for the light pattern-adjusting module M2 as shown in FIG. 4 can be obtained, and therefrom a corresponding modified region MA extending in the thickness direction TD of the substrate 20 can be formed. With the specific pattern appearance and transmission energy contributed by the FWHM P2 of the axial energy distribution of the light pattern, the desired modified region can be formed in the substrate 20 to present an appearance meeting the pre-cut chamfer angle MA.

Further, Step S130 further includes a step of adjusting the axial energy distribution of the light pattern of the laser beam LB to properly locate the focal position FP in the substrate 20. For example, as shown in FIG. 2B, the axial energy distribution of the light pattern of the laser beam LB in an axial direction ZD (i.e., the direction from the light pattern-adjusting module 10 toward the substrate 20) provided by the light pattern-adjusting module 10 is adjusted.

For example, in one embodiment, referring also to FIG. 2B, by having the chamfered surface F3 in FIG. 5C as an example, since the chamfered surface F3 is not symmetric with respect to the center ZX of the substrate 20, thus the light pattern-adjusting module M3 can be selected. By adjusting the axial energy distribution of the light pattern of the laser beam LB in the axial direction ZD provided by the light pattern-adjusting module M3 to properly locate the focal position FP below the center ZX by a specific distance in the substrate 20, the FWHM P3 of the axial energy distribution of the light pattern for the light pattern-adjusting module M3 as shown in FIG. 4 can be obtained, and therefrom a corresponding modified region MA extending in the thickness direction TD of the substrate 20 can be formed. With the specific pattern appearance and transmission energy contributed by the FWHM P3 of the axial energy distribution of the light pattern, the desired modified region can be formed in the substrate 20 to present an appearance meeting the pre-cut chamfer angle MA.

In one embodiment, referring also to FIG. 2B, by having the chamfered surface F4 in FIG. 5D as an example, since the chamfered surface F4 is also not symmetric with respect to the center ZX of the substrate 20, thus the light pattern-adjusting module M2 can be selected. By adjusting the axial energy distribution of the light pattern of the laser beam LB in the axial direction ZD provided by the light pattern-adjusting module M2 to properly locate the focal position FP above the center ZX by a specific distance in the substrate 20, the axial energy distribution of the light pattern for the light pattern-adjusting module M2 as shown in FIG. 4 (also FIG. 5D) can be obtained, and therefrom a corresponding modified region MA extending in the thickness direction TD of the substrate 20 can be formed. With the specific pattern appearance and transmission energy contributed by the axial energy distribution of the light pattern, the desired modified region can be formed in the substrate 20 to present an appearance meeting the pre-cut chamfer angle MA.

Referring back to FIG. 1, then, in Step S140, the modified substrate is etched to cut the modified region from the substrate so as to obtain a chamfered surface fulfilling the pre-cut chamfer angle. In this embodiment, the etching method can select from the group including at least one wet etching and at least one dry etching. For example, in a typical wet etching, an etching tank containing an etching solution is usually used for dipping the substrate. In the art, the etching solution can be an HF or any solution containing erosive materials. Practically, the determination of the etching solution is up to the requirements.

Then, the modified substrate is placed into the etching tank for undergoing stretching process at a proper etching temperature, such that the modified region of the modified substrate can be cut off to obtain the desired chamfered surface. On the other hand, the relevant etching temperature can be determined and varied according to the practical products. As shown in FIG. 5A to FIG. 5E, according to the cutting method for forming a chamfered corner S100 of this disclosure, the chamfered surfaces F1~F5 can be then obtained, in which the chamfered surface can be conical or round.

It shall be explained that, except for Step S130 that the axial energy distribution of the light pattern FA of the laser beam LB emitted by the light pattern-adjusting module 10 is adjusted or modulated to obtain the modified substrate MA fulfilling the pre-cut chamfer angle, this embodiment can promote the etching step of Step S140 by further adjusting the appearance of the modified region MA through varying the etching concentration and the etching speed. Thereupon, the resulted chamfered surface after the etching can better match the appearance fulfilling the pre-cut chamfer angle.

In summary, the cutting method for forming a chamfered corner provided by this disclosure firstly selects a light pattern-adjusting module according to a pre-cut chamfer angle, then utilizes an axial energy distribution of the light pattern of a laser beam to obtain a modified region with chamfers, varies a focal position of the laser beam in the substrate so as to change pattern appearance and transmission energy of the axial energy distribution of the light pattern of the laser beam for obtaining the required appearance of the modified region in the substrate, and finally etches the substrate after modification so as to obtain a desired chamfered surface. Thereupon, to meet various edge needs for versatile electronic products, different but satisfied chamfers can be obtained.

Further, in this disclosure, by adjusting the axial energy distribution of the light pattern and by varying the position of the focus in the substrate, no more additional jig is needed to support the substrate.

In addition, in this disclosure, by adjusting the axial energy distribution of the light pattern and by varying the position of the focus in the substrate, the glass for the screen needn't add mass and thickness. Thus, a substrate with a desired chamfered surface can be made to be light and thin.

Furthermore, the method provided by this disclosure can reduce the entire labor time, and also the possibility of damage glass from producing the chamfered surface can be substantially reduced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A cutting method for forming a chamfered corner, comprising the steps of:
   (a) according to a pre-cut chamfer angle, selecting a light pattern-adjusting module from a plurality of light pattern-adjusting modules, wherein the light pattern-adjusting module specifies the pre-cut chamfer angle;
   (b) the light pattern-adjusting module emitting a laser beam to a substrate, and thus forming a modified region extending in a thickness direction at the substrate;
   (c) the light pattern-adjusting module adjusting an axial energy distribution of a light pattern of the laser beam to vary an appearance of the modified region, so as to form the modified region fulfilling the pre-cut chamfer angle; and
   (d) etching the substrate having the modified region to form a chamfered surface on the substrate by cutting the modified region from the substrate;
   wherein the laser beam has a focal position on the substrate, and the step (c) includes a step of adjusting the focal position of the laser beam having the axial energy distribution of the light pattern at the substrate;
   wherein the step (b) includes a step of the laser beam having the axial energy distribution of the light pattern modifying the substrate.

2. The cutting method for forming a chamfered corner of claim 1, wherein the step (a) includes a step of having a ratio of an FWHM of the axial energy distribution of the light pattern to a thickness of the substrate to be at least greater than 1.2.

3. The cutting method for forming a chamfered corner of claim 1, wherein the axial energy distribution of the light pattern of the laser beam is a form of interference, diffraction or refraction.

4. The cutting method for forming a chamfered corner of claim 1, wherein the light pattern-adjusting module is a lens set consisted of at least one conical lens, at least one spherical lens, at least one aspherical lens and at least one diffractive component.

5. The cutting method for forming a chamfered corner of claim 1, wherein the laser beam emitted by the light pattern-adjusting module has a wavelength ranging from 0.3 µm to 11 µm.

6. The cutting method for forming a chamfered corner of claim 1, wherein the laser beam emitted by the light pattern-adjusting module has an energy density ranging from 0.5 $J/cm^2$ to 80 $J/cm^2$.

7. The cutting method for forming a chamfered corner of claim 1, wherein the step (d) is performed by at least one wet etching or at least one dry etching.

8. The cutting method for forming a chamfered corner of claim 1, wherein the step (a) includes the steps of:
   (a1) placing the substrate on a cutting platform; and
   (a2) inputting a pre-cut route, wherein the pre-cut route includes the pre-cut chamfer angle.

* * * * *